(12) United States Patent
Chen

(10) Patent No.: US 12,528,666 B1
(45) Date of Patent: Jan. 20, 2026

(54) PIPELINE DETECTION DEVICE

(71) Applicant: Shenzhen Sanyi Technology Co., Ltd., Shenzhen (CN)

(72) Inventor: Xiaoquan Chen, Jieyang (CN)

(73) Assignee: Shenzhen Sanyi Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/056,969

(22) Filed: Feb. 19, 2025

(30) Foreign Application Priority Data

Feb. 8, 2025 (CN) .......................... 202520203637.4

(51) Int. Cl.
*B65H 75/40* (2006.01)
*G01N 21/954* (2006.01)

(52) U.S. Cl.
CPC ......... *B65H 75/403* (2013.01); *G01N 21/954* (2013.01)

(58) Field of Classification Search
None
See application file for complete search history.

(56) References Cited

U.S. PATENT DOCUMENTS

| | | | |
|---|---|---|---|
| 11,946,600 | B1 | 4/2024 | Chen |
| D1,058,389 | S * | 1/2025 | Tan .............................. D16/208 |
| 2006/0138270 | A1 * | 6/2006 | Lichtscheidl ...... B65H 75/4465 |
| | | | 242/401 |
| 2012/0147173 | A1 * | 6/2012 | Lynch .................. G01N 21/954 |
| | | | 348/E7.087 |
| 2018/0148946 | A1 * | 5/2018 | Sargent .............. B65H 75/4468 |
| 2018/0169719 | A1 * | 6/2018 | Turner ................. B65H 75/403 |
| 2019/0346330 | A1 * | 11/2019 | Krohlow ................. F16L 55/30 |
| 2021/0260879 | A1 * | 8/2021 | Simpfendorfer ...... B08B 9/0495 |
| 2022/0085592 | A1 | 3/2022 | Olsson et al. |
| 2022/0416528 | A1 | 12/2022 | Martin et al. |
| 2023/0038357 | A1 | 2/2023 | Olsson et al. |

FOREIGN PATENT DOCUMENTS

CN 222256167 U 12/2024

* cited by examiner

*Primary Examiner* — William A. Rivera

(57) ABSTRACT

A pipeline detection device relates to the technical field of pipeline detection, has a flat state and an upright state, and includes a mounting frame, a host box arranged at a top of the mounting frame and a wire spool arranged inside the mounting frame, wherein a telescopic pull rod is fixedly arranged below the mounting frame along a radial direction of the wire spool, at least one roller is arranged on one side of a bottom of the mounting frame far away from a telescopic end of the pull rod, a fixing portion configured to fix the pull rod is arranged on the mounting frame, and is configured to support the pipeline detection device in the flat state; and the mounting frame is further provided with a supporting portion, and the supporting portion and the roller cooperate to support the pipeline detection device in the upright state.

13 Claims, 4 Drawing Sheets

PIPELINE DETECTION DEVICE

CROSS-REFERENCE TO RELATED APPLICATIONS

The application claims priority of Chinese patent application CN202520203637.4, filed on Feb. 8, 2025, which is incorporated herein by reference in its entireties.

TECHNICAL FIELD

The present invention relates to the technical field of detection equipment, and specifically to a pipeline detection device.

BACKGROUND

A pipeline detection device is a novel high-tech product designed and produced based on a requirement of detecting inner surfaces of straight pipelines in petrochemical industry, industrial machinery, electronic and electrical industry, aerospace and the like, and integrates optics, mechanics, electronics and image processing software, so that an operator freezes, amplifies, analyzes, measures and prints reports on suspicious points and flaw detection positions in the observed pipeline with the help of a special professional software processing system by using a high-definition color CCD, and the accuracy of determining the flaw detection positions on inner walls of pipelines is greatly improved.

A pipeline detection device on the market is usually composed of a mounting frame, a host box and a wire spool, wherein an electric wire is wound on the wire spool, one end of the electric wire is electrically connected to the host box, and another end of the electric wire is connected to a detection camera.

However, the existing pipeline detection device needs to be moved manually, which is time-consuming and labor-intensive. In addition, the pipeline detection device is usually large in size, occupies more space, and is inconvenient to store and transport.

SUMMARY

An objective of the present invention is to provide a pipeline detection device to solve the problem that a pipeline detection device in the prior art needs to be manually moved, which is time-consuming and labor-intensive, occupies more space, and is inconvenient to store and transport.

A technical solution used by the present invention is as follows: a pipeline detection device has a flat state and an upright state and includes a mounting frame, a host box arranged on the mounting frame, and a wire spool arranged inside the mounting frame; a telescopic pull rod is fixedly arranged along a radial direction of the wire spool on one side of the mounting frame away from the host box, and at least one roller is arranged on one side of a bottom of the mounting frame far away from a telescopic end of the pull rod;

the mounting frame is provided with a fixing portion for fixing the pull rod, the fixing portion protrudes out of a plane where the pull rod is located, and the fixing portion is also configured to support the pipeline detection device in a flat state; and the mounting frame is also provided with a supporting portion, the supporting portion and the roller are located in a same plane, and the supporting portion and the roller cooperate to support the pipeline detection device in an upright state.

With the above technical solution, the present invention has the following beneficial effects:

When the pipeline detection device needs to be moved, the telescopic pull rod fixedly arranged below the mounting frame along the radial direction of the wire spool cooperates with the roller arranged on one side of the bottom of the mounting frame far away from the telescopic end of the pull rod, so that the pipeline detection device is moved without manual handling, which saves manpower and material resources and reduces the labor intensity of the staff. The pipeline detection device may be switched between a flat state and an upright state to reduce space occupation, thereby facilitating storage and transportation.

BRIEF DESCRIPTION OF DRAWINGS

To describe the technical solutions in embodiments of the present invention or in the conventional technology more clearly, the following briefly describes the accompanying drawings for describing embodiments or the conventional technology. It is clear that the accompanying drawings in the following description show merely some embodiments of the present invention, and a person of ordinary skill in the art may still derive other drawings from these accompanying drawings without creative efforts.

Figure 1:
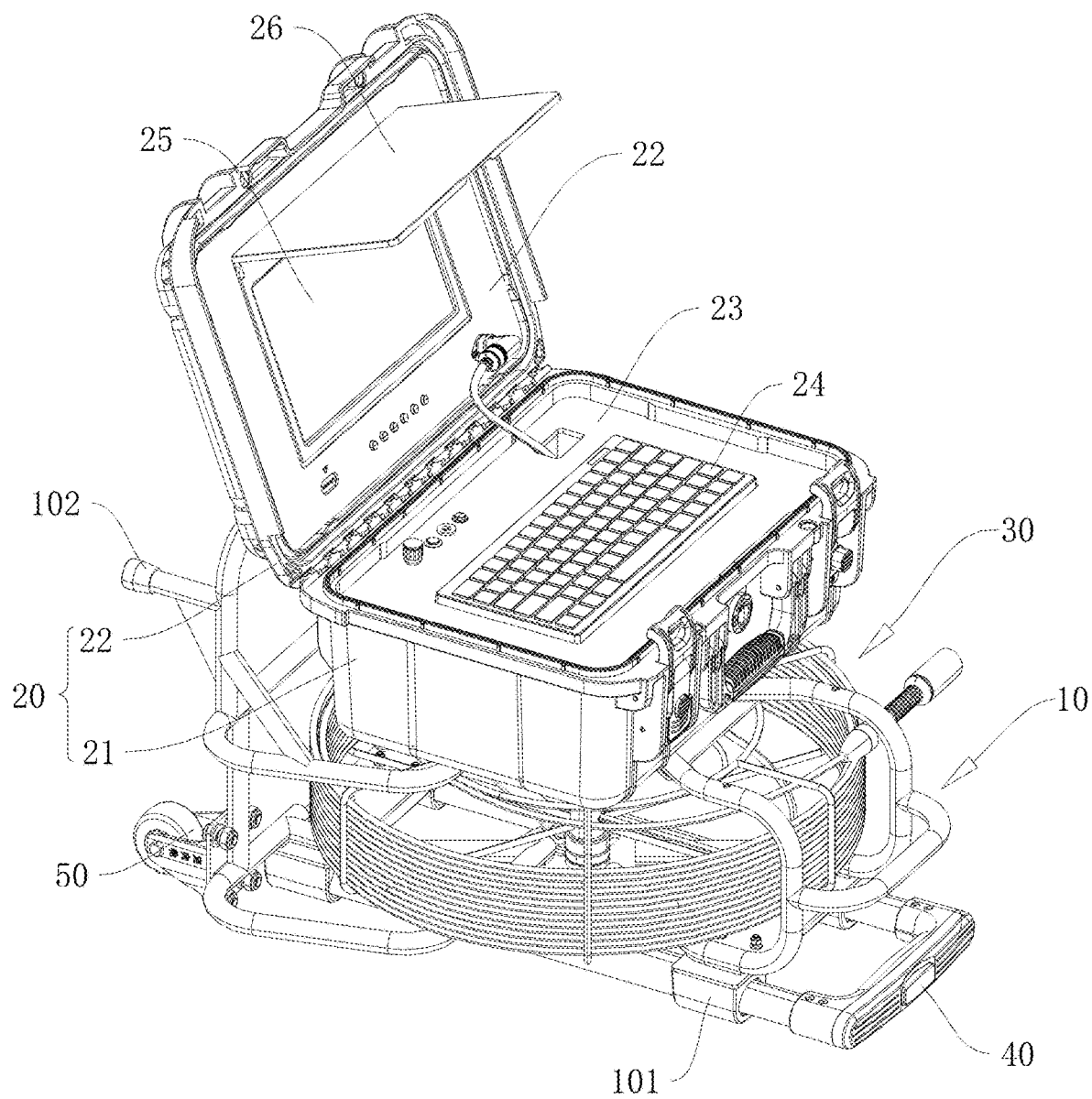
FIG. 1 is a display diagram of a pipeline detection device in a flat state according to an embodiment.

Description of reference numerals: 10: mounting frame; 101: fixing portion; 102: supporting portion; 11: first bracket; 111: upper bracket; 112: lower bracket; 1121: vertical rod; 113: reinforcing plate; 114: connecting column; 12: second bracket; 121: left bracket; 122: right bracket; 123: U-shaped tube structure; 1231: short side tube; 1232: long side tube; 1233: connecting tube; 124: fixing plate; 13: third bracket; 14: fourth bracket; 141: U-shaped bending structure; 142: U-shaped handle; 20: host box; 21: box body; 22: box cover; 23: main control circuit board; 24: control keyboard; 25: display screen; 26: protection plate; 30: wire spool; 31: upper mounting plate; 311: annular plate; 312: mounting lug; 32: rotating shaft; 33: lower mounting plate; 34: wire spool bracket; 35: cable; 36: detection camera; 40: pull rod; and 50: roller.

DETAILED DESCRIPTION OF EMBODIMENTS

Figure 2:
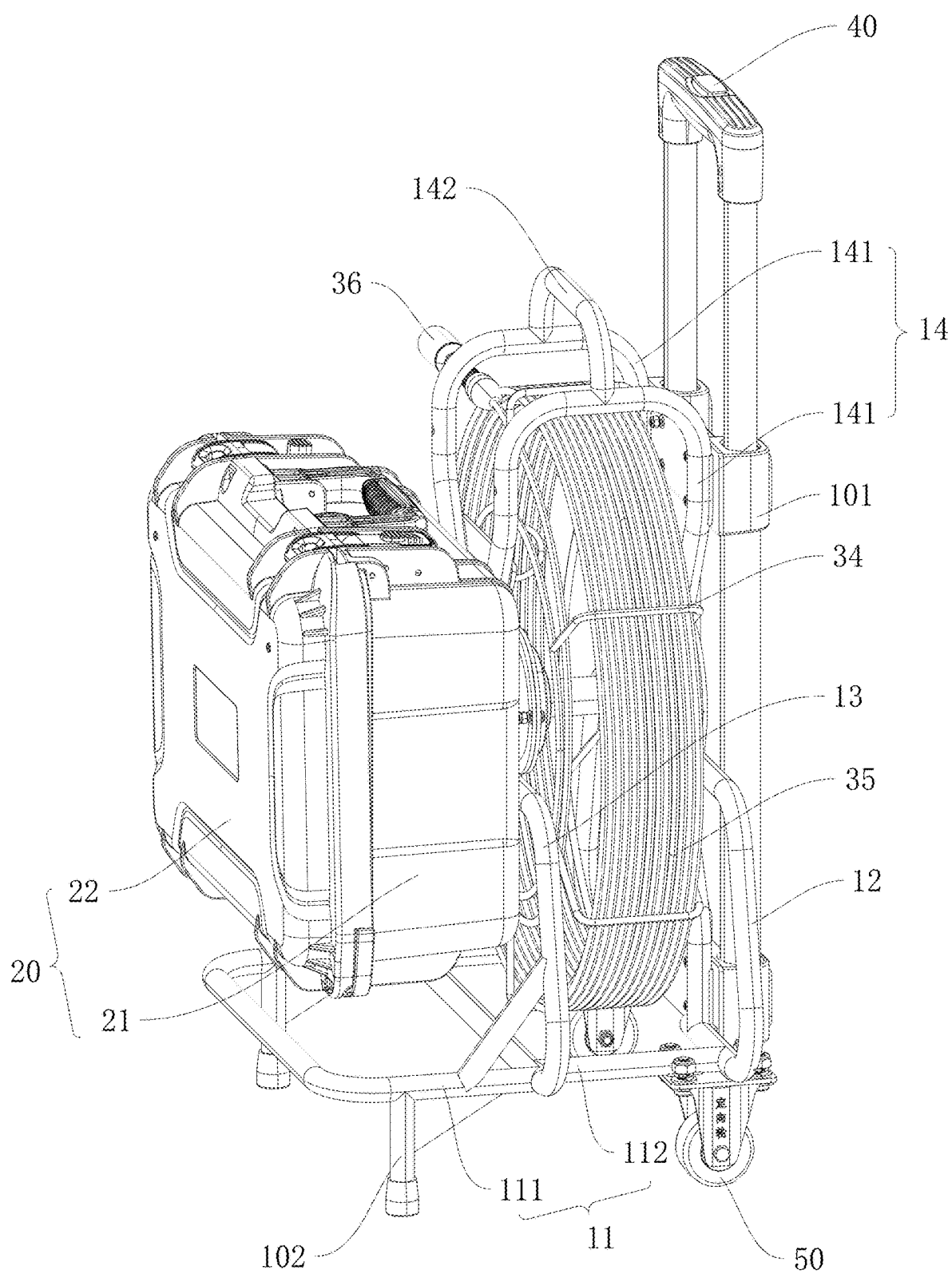
FIG. 2 is a display diagram of a pipeline detection device in an upright state according to an embodiment.
Figure 3:
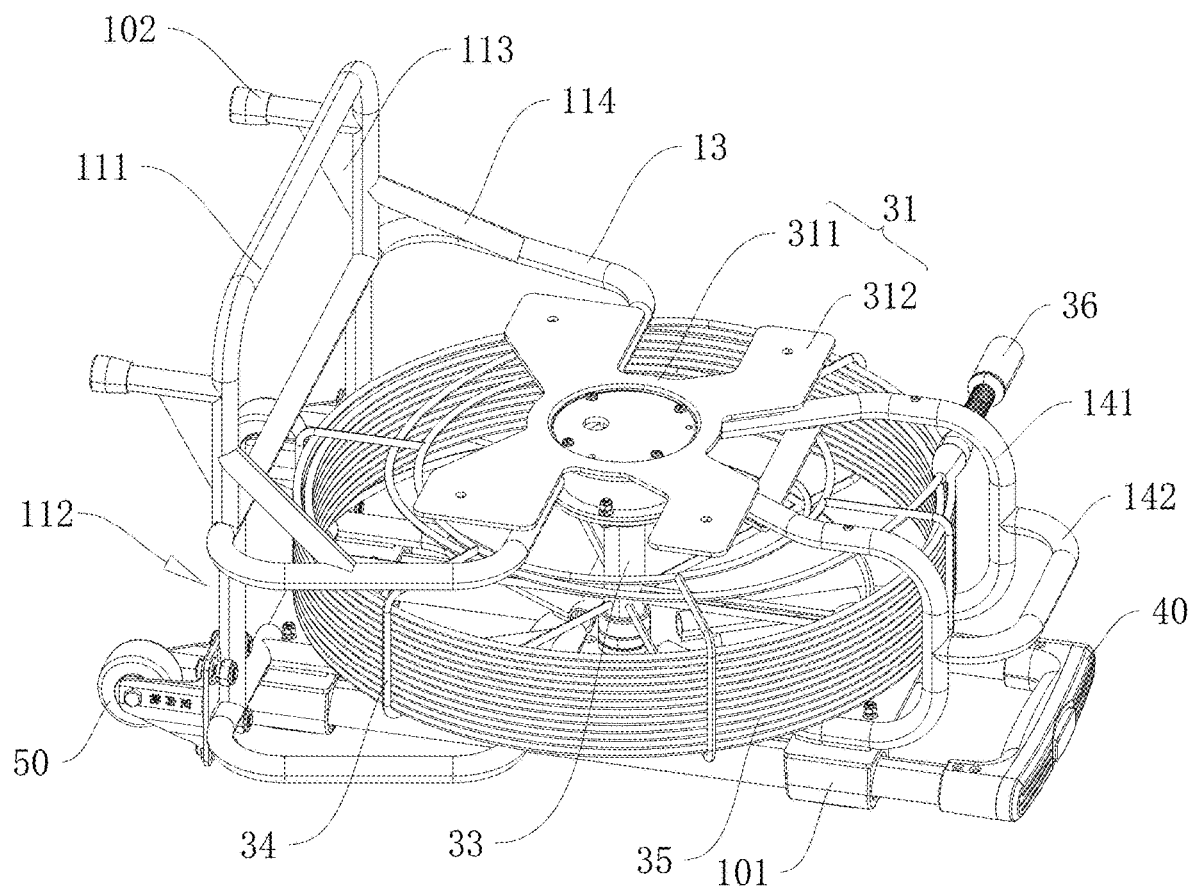
FIG. 3 is a display diagram of FIG. 1 with a host box removed.
Figure 4:
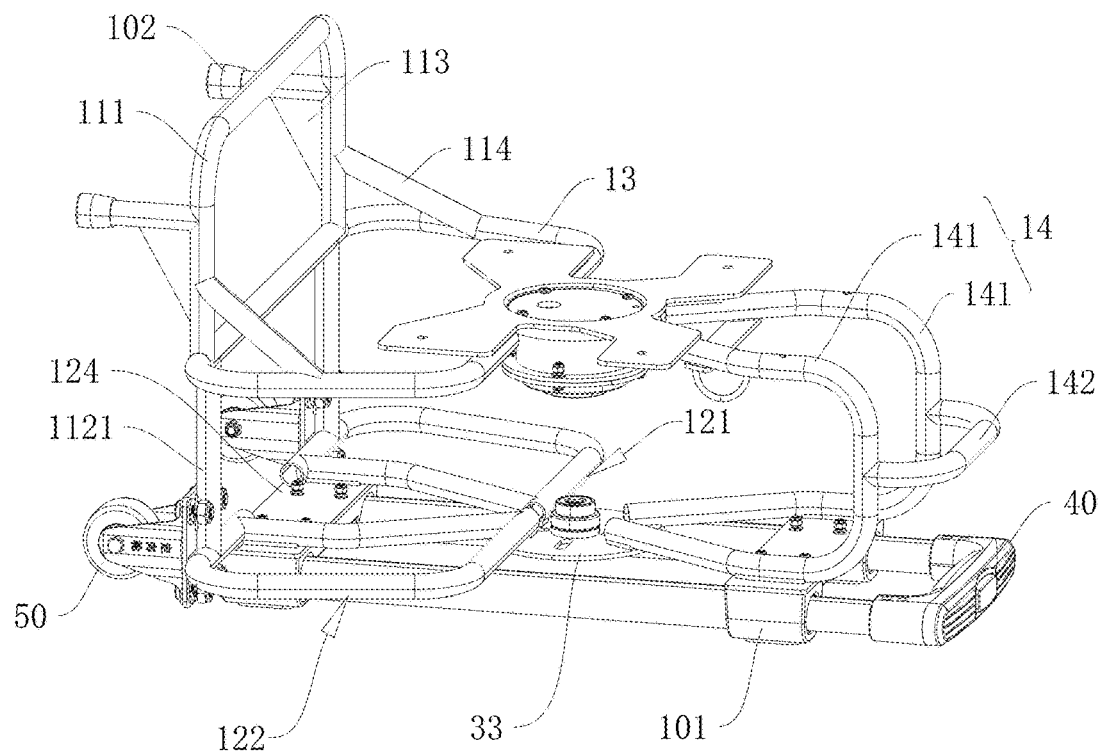
FIG. 4 is a display diagram of a structure of FIG. 3 with a wire spool removed.
Figure 5:
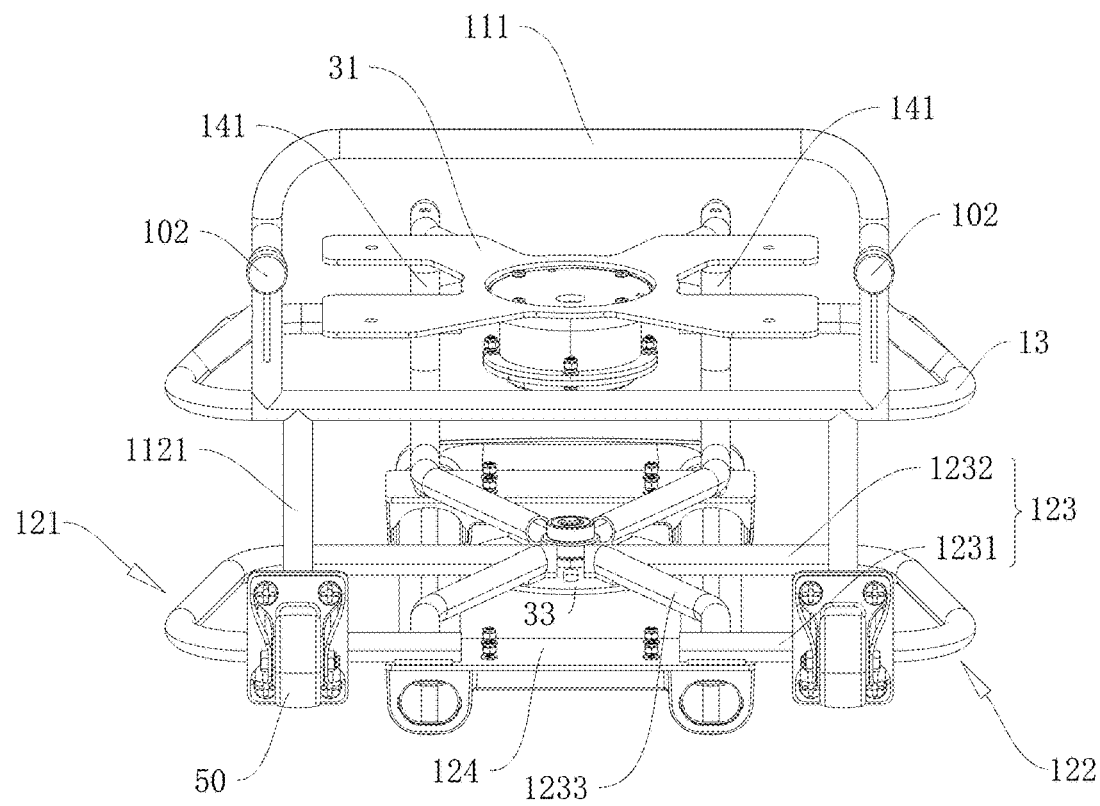
FIG. 5 is a left side view of FIG. 4.

The following clearly and completely describes the technical solutions in the embodiments of the present invention with reference to FIGS. 1 to 5 in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

An embodiment relates to a pipeline detection device, referring to FIGS. 1 to 5, has a flat state and an upright state and includes a mounting frame 10, a host box 20 arranged on the mounting frame 10, and a wire spool 30 arranged inside the mounting frame 10; a telescopic pull rod 40 is fixedly arranged along a radial direction of the wire spool 30 on one side of the mounting frame 10 away from the host box, and at least one roller 50 is arranged on one side of a bottom of the mounting frame 10 far away from a telescopic end of the pull rod 40.

The mounting frame 10 is provided with a fixing portion 101 for fixing the pull rod 40, the fixing portion 101 protrudes out of a plane where the pull rod 40 is located, and the fixing portion 101 is also configured to support the pipeline detection device in a flat state. The mounting frame 10 is also provided with a supporting portion 102, the supporting portion 102 and the roller 50 are located in a same plane, and the supporting portion 102 and the roller 50 cooperate to support the pipeline detection device in an upright state.

In this embodiment, the pull rod 40 is a manual telescopic pull rod 40, which may be specifically referred to as a luggage case pull rod 40, one end of which is a fixed end and another end is a telescopic end. Two rollers 50 are provided, and the two rollers 50 are symmetrically arranged. In other embodiments, the pull rod 40 may also be other telescopic structures, such as an electric telescopic rod, and a quantity of the rollers 50 may also be set to be one, three, or four based on an actual requirement.

In addition, it should be noted that the pipeline detection device in the flat state is in an operating state, that is, the pipeline detection device may normally detect and analyze the pipeline; and the pipeline detection device in the upright state is in a non-operating state, so that the pipeline detection device in the upright state occupies a smaller space than the pipeline detection device in the flat state, and is convenient to store and transport.

With the fixation of the telescopic pull rod 40 along the radial direction of the wire spool 30 below the mounting frame 10 and the mounting of the roller 50 on the bottom of the mounting frame 10 far away from the telescopic end of the pull rod 40, the staff can move the pipeline detection device like pulling a luggage case without manual handling, thus saving manpower and material resources and reducing the labor intensity of the staff. In addition, the pipeline detection device switches between the flat state and the upright state, which reduces space occupation, thereby facilitating the storage and transportation of the pipeline detection device, and solves the problems of difficult movement of the existing pipeline detection device, laborious moving process, and inconvenience of storage and transportation.

Further, the supporting portion 102 includes a supporting leg fixedly mounted on the mounting frame 10, one end of the supporting leg is fixedly mounted on the mounting frame, and another end of the supporting leg extends along a direction opposite to a telescopic direction of the pull rod 40.

In this embodiment, two supporting legs and two rollers 50 are provided, so that the supporting legs and the rollers 50 can stably support the pipeline detection device in the upright state. In other embodiments, a quantity of the supporting legs and the rollers 50 may be adjusted based on an actual requirement. For example, one roller 50 and two supporting legs are provided, two rollers 50 and one supporting leg are provided, or more than two rollers and more than two supporting legs are provided. This is not limited herein.

Further, the mounting frame 10 includes a first bracket 11, a second bracket 12 and a third bracket 13 fixedly mounted on the first bracket 11, and a fourth bracket 14 arranged on one side of the second bracket 12 away from the first bracket 11, wherein the first bracket 11 is arranged along a direction perpendicular to the pull rod 40, the supporting legs and the rollers 50 are both located on the first bracket 11, the second bracket 12 and the third bracket 13 are both perpendicular to a plane where the first bracket 11 is located, the third bracket 13 is arranged above the second bracket 12, the third bracket 13 cooperates with the fourth bracket 14 to support the host box 20, and the first bracket 11, the second bracket 12, the third bracket 13 and the fourth bracket 14 cooperate to form an accommodating space configured to accommodate the wire spool 30.

It may be understood that the accommodating space formed by the cooperation of the first bracket 11, the second bracket 12, the third bracket 13 and the fourth bracket 14 accommodates the wire spool 30, so that the wire spool 30 may be stably accommodated, and the host box 20 can be stably supported, thereby improving the overall stability of the entire pipeline detection device.

Further, the first bracket 11 includes an upper bracket 111 and a lower bracket 112, the upper bracket 111 is vertically mounted at one end of a top of the third bracket 13, the lower bracket 112 includes two vertical rods 1121 symmetrically arranged between the second bracket 12 and the third bracket 13, and two ends of the vertical rods 1121 are respectively and fixedly connected to the second bracket 12 and the third bracket 13.

The upper bracket 111 and the lower bracket 112 are fixedly connected to the second bracket 12 and the third bracket 13 by welding, the upper bracket 111 is a U-shaped structure that is reversely fastened to the third bracket 13, and the lower bracket 112 and the upper bracket 111 are staggered, that is, two vertical rods 1121 of the lower bracket 112 are located on an inner side of an opening of the upper bracket 111.

Further, the second bracket 12 includes a left bracket 121 and a right bracket 122 which are symmetrically arranged, each of the left bracket 121 and the right bracket 122 includes a U-shaped tube structure 123 with two different side lengths and a connecting tube 1233 configured to connect a long side tube 1232 and a short side tube of the U-shaped tube structure 123, wherein the long side tube 1232 of the U-shaped tube structure 123 of each of the left bracket 121 and the right bracket 122 is located at a center of the wire spool 30, one end of the connecting tube 1233 is fixedly connected to the short side tube 1231 of the U-shaped tube structure 123, and another end of the connecting tube extends in a direction perpendicular to a length direction of the short side tube 1231 of the U-shaped tube structure 123 and is fixedly connected to the long side tube 1232 of the U-shaped tube structure 123 after being bent outward.

A fixing plate 124 is further provided between the left bracket 121 and the right bracket 122 to make the connection between the left bracket 121 and the right bracket 122 more firmly, and the fixed end of the pull rod 40 is fixedly connected to the fixing plate 124 by bolts, so that the pipeline detection device can be smoothly driven to move by the pull rod 40.

Further, the third bracket 13 is arranged in a rounded rectangular frame shape, one end of the third bracket 13 is located above the wire spool 30, and the upper bracket 111 and the lower bracket 112 are respectively and fixedly connected to an upper side and a lower side of one end of the third bracket 13 far away from the wire spool 30.

In other embodiments, the third bracket 13 may also be configured in other shapes such as a rectangular frame, and an arc frame. This is not limited herein.

Further, the fourth bracket 14 includes two U-shaped bending structures 141 symmetrically arranged, an opening of each of the two U-shaped bending structures 141 faces the second bracket 12 and the third bracket 13, one side of the wire spool 30 is accommodated in the opening of each of the two U-shaped bending structures 141, and another side of the wire spool 30 is accommodated in an area formed cooperatively by the second bracket 12 and the third bracket 13.

The fourth bracket 14 is configured as two symmetrically arranged U-shaped bending structures 141, so that the first bracket 11, the second bracket 12, the third bracket 13 and the fourth bracket 14 cooperate to form a structurally stable accommodating space, thereby achieving stable storage of the wire spool 30 and saving production costs.

Further, a distance between an upper side and a lower side of the two U-shaped bending structures 141 gradually increases along a radial direction of the wire spool 30. That is, an upper side and a lower side of the two U-shaped bending structures 141 cooperate to form a splayed shape, so that when the pipeline detection is performed, the U-shaped bending structures 141 do not affect the use of the wire spool 30, which is convenient for staff to use.

Further, a U-shaped handle 142 is further provided between the two U-shaped bending structures 141, two ends of the U-shaped handle 142 are respectively fixedly connected to closed ends of the two U-shaped bending structures 141, and the U-shaped handle 142 is located above the telescopic end of the pull rod.

When an external force needs to be applied to the pipeline detection device, the U-shaped handle 142 can provide a force point, and meanwhile, the overall stability of the mounting frame 10 is further improved.

Further, two reinforcing plates 113 are provided on the upper bracket 111, the two reinforcing plates 113 are arranged in a shape of right triangles, the two reinforcing plates 113 are correspondingly mounted at two supporting legs respectively, and two right-angled sides of the reinforcing plates 113 are tightly attached and fixedly connected to the upper bracket 111 and the supporting legs.

The reinforcing plate 113 is provided to make the connection between the supporting portion 102 and the upper bracket 111 more firmly, so that the supporting portion 102 can cooperate with the roller 50 to stably support the pipeline detection device in an upright state.

Further, two connecting columns 114 are further provided on the upper bracket 111, the two connecting columns 114 are obliquely and symmetrically arranged, one end of each of the connecting columns 114 is fixedly connected to one side of the upper bracket 111 away from the reinforcing plate 113, and another end of each of the connecting columns 114 is fixedly connected to a top of the third bracket 13.

With the arrangement of the two connecting columns 114, the upper bracket 111 and the third bracket 13 are connected more firmly, and the structural strength and the overall stability of the mounting frame 10 are further improved.

Further, the wire spool 30 includes an upper mounting plate 31, a rotating shaft 32, a lower mounting plate 33 and a wire spool bracket 34 provided between the upper mounting plate 31 and the lower mounting plate 33, which are coaxially arranged from top to bottom, the upper mounting plate 31 is fixedly mounted at a top of the mounting frame 10, the lower mounting plate 33 is fixedly mounted at a bottom of the mounting frame 10, two ends of the rotating shaft 32 are respectively rotatably connected to the upper mounting plate 31 and the lower mounting plate 33 by bearings, a cable 35 is wound outside the rotating shaft 32, the cable 35 is accommodated in the wire spool bracket 34, one end of the cable 35 is electrically connected to the host box 20, and another end of the cable 35 is connected to a detection camera 36.

It may be understood that the detection camera 36 is connected to the host box 20 via the cable 35, so that the detection camera 36 can transmit the situation in the pipeline to the host box 20 in real time, thereby achieving accurate detection and analysis of the pipeline.

Further, the upper mounting plate 31 includes an annular plate 311 and four mounting lugs 312, the four mounting lugs 312 are uniformly distributed along a circumferential direction of the annular plate 311, and the four mounting lugs 312 are integrally formed with the annular plate 311. Compared with configuring the upper mounting plate 31 as a complete plate body, the configuration of the annular plate 311 and the mounting lugs 312 can effectively reduce production costs.

Further, the host box 20 includes a box body 21 and a box cover 22, the box body 21 is fixedly mounted on the mounting lugs 312 of the upper mounting plate 31, a main control circuit board 23 and a control keyboard 24 are arranged in the box body 21, and the display screen 25 is arranged on an inner side of the box cover 22.

When the pipeline is detected, the staff may operate the relevant instructions by the control keyboard 24, control the detection camera 36 at the front end of the cable by the main control circuit board 23 to move and capture a video, and analyze the captured results by a built-in program of the host box 20. The real-time video captured by the detection camera 36 may be transmitted to the display screen 25 for the staff to view, which assists the staff in efficient and intuitive pipeline inspection.

Further, a protection plate 26 is rotatably arranged at an inner side of the box cover 22, and a size of the protection plate 26 is adapted to that of the display screen 25. Specifically, the size of the protection plate 26 is slightly greater than the size of the display screen 25, and the protection plate 26 is configured to cover a surface of the display screen 25.

When the box cover 22 is closed, the protection plate 26 may be placed on the surface of the display screen 25 to protect the display screen 25 and prevent parts inside the box body 21 from scratching the screen. Meanwhile, when the box cover 22 is opened for pipeline detection and analysis, opening the protection plate 26 may prevent the external light from being too bright and causing light reflection on the screen, affecting the observation effect of the display screen 25 by the staff.

The above description is only intended to illustrate the technical solution of the present invention and not to limit the present invention, and other modifications or equivalent substitutions made by those skilled in the art to the technical solution of the present invention should be covered by the scope of the claims of the present invention without departing from the spirit and scope of the technical solution of the present invention.

What is claimed is:

1. A pipeline detection device, having a flat state and an upright state, and comprising:
   a mounting frame (10),
   a host box (20) arranged on the mounting frame (10), and
   a wire spool (30) arranged inside the mounting frame (10), wherein a telescopic pull rod (40) is fixedly arranged along a radial direction of the wire spool (30) on one side of the mounting frame (10) away from the host box, and at least one roller (50) is arranged on one side of a bottom of the mounting frame (10) far away from a telescopic end of the pull rod (40);

the mounting frame (10) is provided with a fixing portion (101) for fixing the pull rod (40), the fixing portion (101) protrudes out of a plane where the pull rod (40) is located, and the fixing portion (101) is also configured to support the pipeline detection device in a flat state; and the mounting frame (10) is also provided with a supporting portion (102), the supporting portion (102) and the roller (50) are located in a same plane, and the supporting portion (102) and the roller (50) cooperate to support the pipeline detection device in an upright state;

wherein the supporting portion (102) comprises a supporting leg; the mounting frame (10) comprises a first bracket (11), a second bracket (12), a third bracket (13) and a fourth bracket (14); the first bracket (11) is arranged along a direction perpendicular to a telescopic direction of the pull rod (40), both the supporting leg and the roller (50) are located on the first bracket (11), both the second bracket (12) and the third bracket (13) are perpendicular to the first bracket (11), the third bracket (13) is located above the second bracket (12), the third bracket (13) and the fourth bracket (14) cooperate to support the host box (20), and the first bracket (11), the second bracket (12), the third bracket (13) and the fourth bracket (14) cooperate to form an accommodating space configured to accommodate the wire spool (30).

2. The pipeline detection device according to claim 1, wherein the supporting leg is fixedly mounted on the mounting frame (10), one end of the supporting leg is fixedly mounted on the mounting frame (10), and another end of the supporting leg extends along a direction opposite to the telescopic direction of the pull rod (40).

3. The pipeline detection device according to claim 1, wherein the first bracket (11) comprises an upper bracket (111) and a lower bracket (112), the upper bracket (111) is fixedly mounted at one end of a top of the third bracket (13), the lower bracket (112) comprises two vertical rods (1121) symmetrically arranged between the second bracket (12) and the third bracket (13), and two ends of the vertical rod (1121) are respectively fixedly connected to the second bracket (12) and the third bracket (13).

4. The pipeline detection device according to claim 3, wherein two reinforcing plates (113) are provided on the upper bracket (111), the two reinforcing plates (113) are arranged in a shape of right triangles, the two reinforcing plates (113) correspond to two supporting legs respectively, and two right-angled sides of the reinforcing plates (113) are tightly attached and fixedly connected to the upper bracket (111) and the supporting legs.

5. The pipeline detection device according to claim 4, wherein two connecting columns (114) are further provided on the upper bracket (111), the two connecting columns (114) are obliquely and symmetrically arranged, one end of each of the connecting columns (114) is fixedly connected to one side of the upper bracket (111) away from the reinforcing plate (113), and another end of each of the connecting columns (114) is fixedly connected to a top of the third bracket (13).

6. The pipeline inspection device according to claim 1, wherein the second bracket (12) comprises a left bracket (121) and a right bracket (122) which are symmetrically arranged, each of the left bracket (121) and the right bracket (122) comprises a U-shaped tube structure (123) with two different side lengths and a connecting tube (1233) configured to connect a long side tube (1232) and a short side tube (1231) of the U-shaped tube structure (123), the long side tube (1232) of the U-shaped tube structure (123) of each of the left bracket (121) and the right bracket (122) is located at a center of the wire spool (30), one end of the connecting tube (1233) is fixedly connected to the short side tube (1231) of the U-shaped tube structure (123), and another end of the connecting tube extends in a direction perpendicular to a length direction of the short side tube (1231) of the U-shaped tube structure (123) and is fixedly connected to the long side tube (1232) of the U-shaped tube structure (123) after being bent outward.

7. The pipeline detection device according to claim 1, wherein the third bracket (13) is arranged in a rounded rectangular frame shape, one end of the third bracket (13) is located above the wire spool (30), and the upper bracket (111) and the lower bracket (112) are respectively and fixedly connected to an upper side and a lower side of one end of the third bracket (13) far away from the wire spool (30).

8. The pipeline detection device according to claim 1, wherein the fourth bracket (14) comprises two U-shaped bending structures (141) symmetrically arranged, an opening of each of the two U-shaped bending structures (141) faces the second bracket and the third bracket, and one side of the wire spool (30) is accommodated in the opening of each of the two U-shaped bending structures (141).

9. The pipeline detection device according to claim 8, wherein a distance between an upper side and a lower side of the two U-shaped bending structures (141) gradually increases along the radial direction of the wire spool (30).

10. The pipeline detection device according to claim 8, wherein a U-shaped handle (142) is further provided between the two U-shaped bending structures (141), two ends of the U-shaped handle (142) are respectively fixedly connected to closed ends of the two U-shaped bending structures (141), and the U-shaped handle (142) is located above a telescopic end of the pull rod.

11. The pipeline detection device according to claim 1, wherein the wire spool (30) comprises an upper mounting plate (31), a rotating shaft (32), a lower mounting plate (33) and a wire spool bracket (34) coaxially arranged from top to bottom, the wire spool bracket is arranged between the upper mounting plate and the lower mounting plate (33), the upper mounting plate (31) and the lower mounting plate (33) are respectively fixedly mounted at a top and a bottom of the mounting frame (10), two ends of the rotating shaft (32) are respectively and rotatably connected to the upper mounting plate (31) and the lower mounting plate (33), a cable (35) is wound outside the rotating shaft (32), the cable (35) is accommodated in the wire spool bracket (34), one end of the cable (35) is electrically connected to the host box (20), and another end of the cable (35) is connected to the detection camera (36).

12. The pipeline detection device according to claim 11, wherein the upper mounting plate (31) comprises an annular plate (311) and four mounting lugs (312), the four mounting lugs (312) are uniformly distributed along a circumferential direction of the annular plate (311), and the four mounting lugs (312) are integrally formed with the annular plate (311).

13. The pipeline detection device according to claim 1, wherein the host box (20) comprises a box body (21) and a box cover (22), the box body (21) is fixedly mounted on the mounting lugs (312) of the upper mounting plate (31), a main control circuit board (23) and a control keyboard (24) are arranged in the box body (21), and the display screen (25) is arranged on an inner side of the box cover (22).

\* \* \* \* \*